(12) United States Patent
Alexander et al.

(10) Patent No.: US 7,891,080 B2
(45) Date of Patent: Feb. 22, 2011

(54) TECHNIQUES FOR DETECTING HEAD-DISC CONTACT

(75) Inventors: James C. Alexander, Boulder, CO (US); Jason H. Laks, Westminster, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 566 days.

(21) Appl. No.: 11/935,711

(22) Filed: Nov. 6, 2007

(65) Prior Publication Data

US 2008/0062556 A1   Mar. 13, 2008

Related U.S. Application Data

(63) Continuation-in-part of application No. 11/693,458, filed on Mar. 29, 2007, now Pat. No. 7,502,194.

(60) Provisional application No. 60/743,925, filed on Mar. 29, 2006.

(51) Int. Cl.
*G11B 5/127* (2006.01)
*H04R 31/00* (2006.01)

(52) U.S. Cl. .............. 29/603.09; 29/603.03; 29/603.04; 29/603.07; 29/603.12; 324/210; 324/212; 360/75; 360/78.05; 360/78.12; 360/121; 360/317; 369/44.23

(58) Field of Classification Search .............. 29/603.03, 29/603.04, 603.07, 63.09, 603.12; 324/210, 324/212; 360/75, 78.05, 78.12, 121, 122, 360/234.7, 264.4, 317; 369/44.23
See application file for complete search history.

(56) References Cited

U.S. PATENT DOCUMENTS

| 5,579,123 | A  | * | 11/1996 | Sato ............................ 386/96 |
| 5,826,325 | A  |   | 10/1998 | Price et al. |
| 6,125,008 | A  |   | 9/2000  | Berg et al. |
| 6,452,753 | B1 | * | 9/2002  | Hiller et al. .............. 360/254.7 |
| 6,563,665 | B1 |   | 5/2003  | Ell |
| 6,580,572 | B1 |   | 6/2003  | Yao et al. |
| 6,600,622 | B1 |   | 7/2003  | Smith |
| 6,624,963 | B2 | * | 9/2003  | Szita ....................... 360/77.08 |
| 6,724,563 | B2 |   | 4/2004  | Kobayashi et al. |
| 6,822,821 | B2 |   | 11/2004 | Gan et al. |
| 6,829,119 | B2 |   | 12/2004 | Bonin et al. |
| 6,898,039 | B2 |   | 5/2005  | Kobayashi et al. |
| 7,000,459 | B2 |   | 2/2006  | Riddering et al. |
| 7,190,547 | B2 |   | 3/2007  | Khurshudov et al. |
| 2003/0142597 | A1 |   | 7/2003  | Park et al. |
| 2004/0080861 | A1 |   | 4/2004  | Bonin et al. |
| 2006/0023339 | A1 |   | 2/2006  | Fukuyama et al. |
| 2006/0245110 | A1 |   | 11/2006 | Hanchi et al. |

FOREIGN PATENT DOCUMENTS

JP   58224469 A  *  12/1983
JP   2005004909 A *  1/2005

* cited by examiner

*Primary Examiner*—Paul D Kim
(74) *Attorney, Agent, or Firm*—Sanders Gwin

(57) ABSTRACT

A method for detecting head-disc contact is disclosed. The method comprises locating a head including a head positioning microactuator and at least one of a read transducer and a write transducer adjacent to a disc such that the head is in communication with the disc, monitoring an output signal from the head positioning microactuator of the head, and evaluating the output signal to determine if the head contacts the disc.

21 Claims, 4 Drawing Sheets

TECHNIQUES FOR DETECTING HEAD-DISC CONTACT

This application is a continuation-in-part application of U.S. application Ser. No. 11/693,458, filed Mar. 29, 2007, which claims the benefit of U.S. provisional application No. 60/743,925, filed Mar. 29, 2006, the entire contents of which are incorporated herein by reference.

BACKGROUND

During the assembly process of a disc drive, the placement of the read/write heads on the disc is a critical operation. During this operation, is important to prevent damage to both the heads and the disc, e.g., damage from head-disc contact. The placement of the read/write heads on the disc typically occurs at a separate station in a disc drive manufacture assembly line, called a head merge station. The head merge station includes a head merge tool. A variety of head merge tools are currently available, including static and dynamic head merge tools. Other types of head merge tools are also available, including space merge head merge tools.

Dynamic head merge tools locate heads directly on spinning discs mounted to a baseplate of the disc drive; whereas static head merge tools locate the heads on stationary discs. In space merge tools, a head is located proximate to the disc, prior to mounting the disc or actuator assembly to the disc drive baseplate. In different examples of head merge tools, heads may be moved to a parked position via a disc drive actuator arm voice coil motor, while a disc drive spindle motor rotates the discs. In other examples, head merge tools may be used to locate the heads directly to parked positions such that powering the disc drive spindle motor and/or actuator arm voice coil motor may not be necessary at the head merge station.

SUMMARY

In one embodiment, the invention is directed to a method for detecting head-disc contact in a disc drive. The method comprises locating a head including a head positioning microactuator and at least one of a read transducer and a write transducer adjacent to a disc such that the head is in communication with the disc, monitoring an output signal from the head positioning microactuator of the head, and evaluating the output signal to determine if the head contacts the disc.

The details of one or more embodiments of the invention are set forth in the accompanying drawings and the description below. Other features, objects, and advantages of the invention will be apparent from the description and drawings, and from the claims.

DETAILED DESCRIPTION

Head merge stations can go out of calibration during the manufacturing of a plurality of disc drives in a disc drive manufacture assembly line. If a head merge station goes out of calibration, some heads may contact discs during the head merge process. This can result in damage to the discs or the heads, thereby reducing the reliability of a disc drive. In some cases, this damage can reduce the reliability of the disc drive enough to cause customer returns and/or self-test failures. Many disc drives may be produced after a head merge station goes out of calibration because it is difficult to determine if a head merge station is out of calibration during the disc drive assembly process.

In general, the invention relates to techniques for detection of head-disc contact during head merge operations. For example, a head merge station may include a circuit that is connected to head positioning microactuators during the head merge operation. Piezoelectric head positioning microactuators commonly used in disc drives produce an electrical signal in response to a deflection caused by head-disc contact. By identifying these electrical signals, head disc contact can be reliably detected. Following detection of head-disc contact, maintenance may be performed on a head merge station before any other disc drives are assembled using that head merge station to prevent additional head-disc contact damage.

Figure 1:
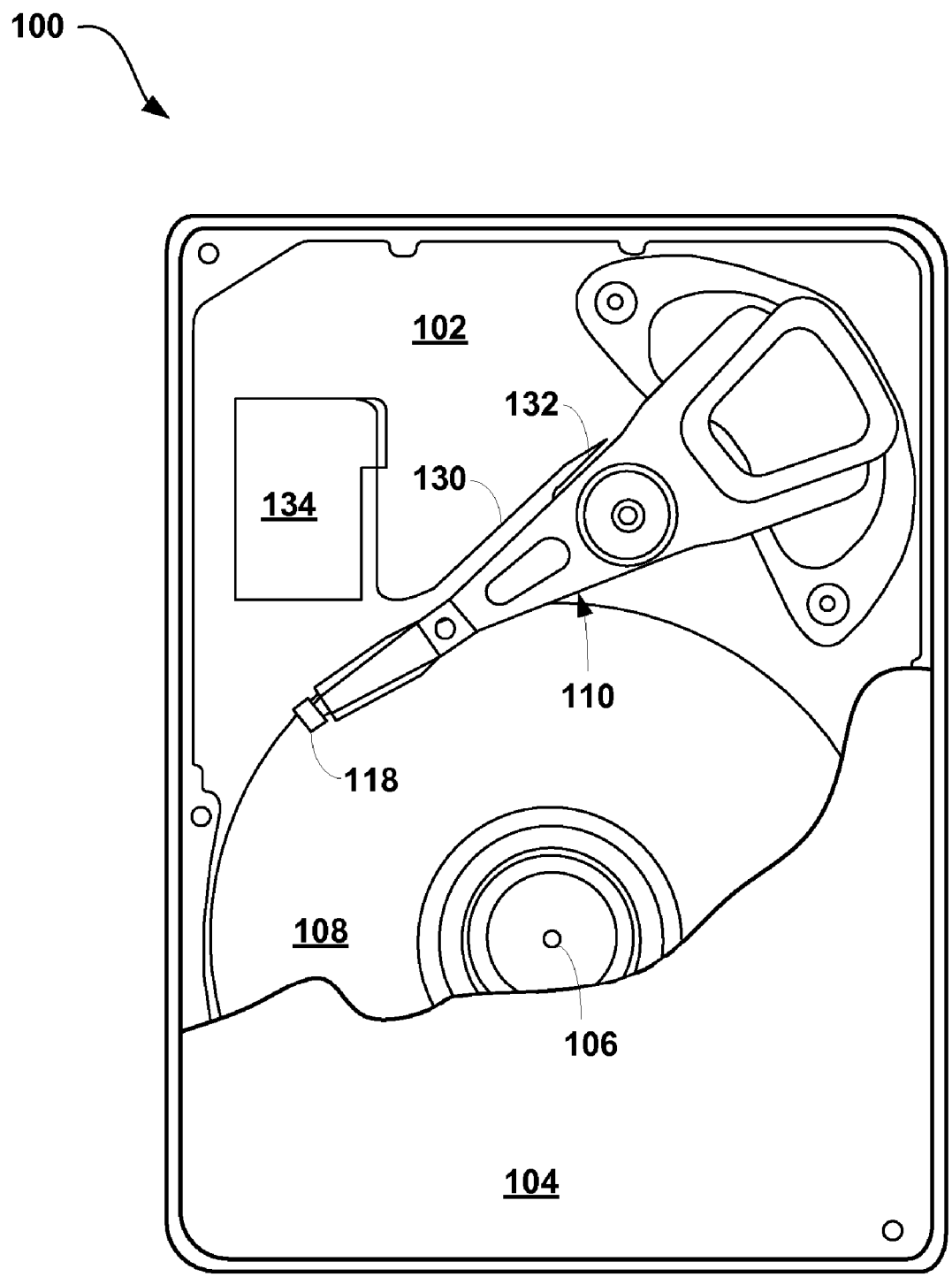
FIG. 1 is an illustration of a disc drive including a head positioning microactuator.

FIG. 1 is an illustration of exemplary disc drive 100, which includes at least one head positioning microactuator that may be used to detect head-disc contact, e.g., contact during a head merge operation during the assembly of disc drive 100. Cover 104, shown partially cut away, cooperates with base 102 to form a housing that defines an internal environment of disc drive 100. Disc drive 100 also includes recordable magnetic disc 108, spindle motor 106 and actuator assembly 110 with head 118. While disc drive 100 only shows a single disc 108 and a single head 118, disc drive 100 optionally includes additional discs 108 and heads 118. Each head 118 may be associated with one or more microactuators used for fine positioning of heads 118 relative to data tracts on discs 108. One or more of these microactuators may be used to detect head-disc contact during a head merge operation during the assembly of disc drive 100.

Spindle motor 106 operates to rotate disc 108. Actuator assembly 110 pivots about bearing shaft assembly 112 moving head 118 across media tracks of disc 108. Flex assembly 130 provides electrical connection paths to control actuator assembly 110 and allows pivotal movement of actuator assembly 110 during operation. Printed circuit board 132 controls read and write operations of head 118. Flex assembly 130 terminates at flex bracket 134.

Figure 2:
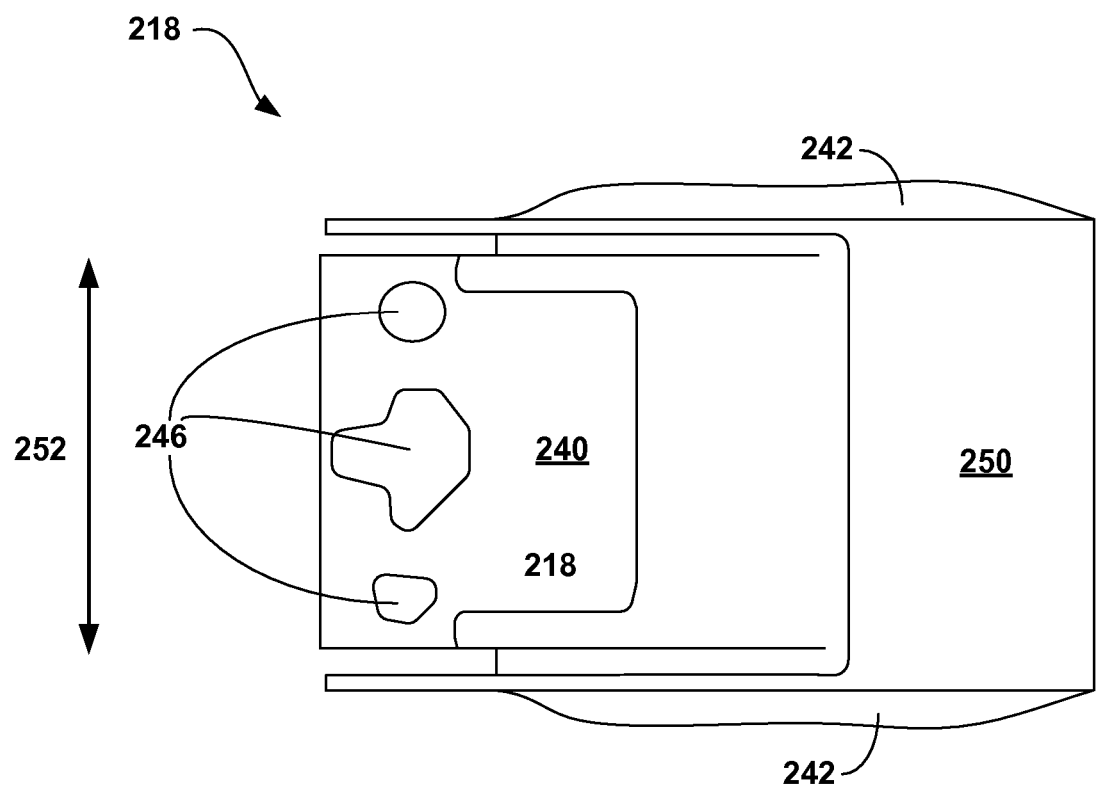
FIG. 2 is a close-up illustration of a disc drive read/write head.

FIG. 2 is a close-up illustration of disc drive read/write head 218. For example, read/write head 218 may be the same as read/write head 118 of data storage disc 100 in FIG. 1. Read/write head 218 includes flexible U-frame 250. Read/write elements 246 are integrated with slider 240. Piezoelectric microactuators 242 operate to flex U-frame 250 in order to move read/write elements 246 along line 252 during read and write operations. Piezoelectric microactuators 242 may be used to position read/write elements 246 accurately relative to data tracks on a data storage disc (not shown).

Piezoelectric microactuators 242 may also be used to measure defections in flexible U-frame 250. For example, a head merge station may include a circuit that is connected to piezoelectric microactuators 242 during a head merge operation in the production of a disc drive. Piezoelectric microactuators 242 produce an electrical signal in response to a deflection, such as a defection occurring when read/write head 218 contacts a data storage disc (not shown). By measuring electrical signals from piezoelectric microactuators 242, contact between read/write head 218 and a data storage disc can be reliably detected. Detecting such contact may be useful, e.g., to determine when maintenance of a head merge station is required to prevent damage to disc drives during the head merge process.

Furthermore, the contact magnitude of a head-disc contact event can be reliably determined to evaluate the likelihood that the contact event resulted in physical damage to the disc and/or head. The piezoelectric output signal amplitude is proportional to the magnitude of physical contact between the head and disc. The output signal is sufficient to detect physical contact well below and well above the point where physical damage occurs. Contact magnitude data may be collected and input into a statistical process control system that provides trend data and maintenance trigger alerts. The electrical signal may be detected using the same electrical connection path used to power piezoelectric microactuators 242 to finely position read write elements 246.

Figure 3:
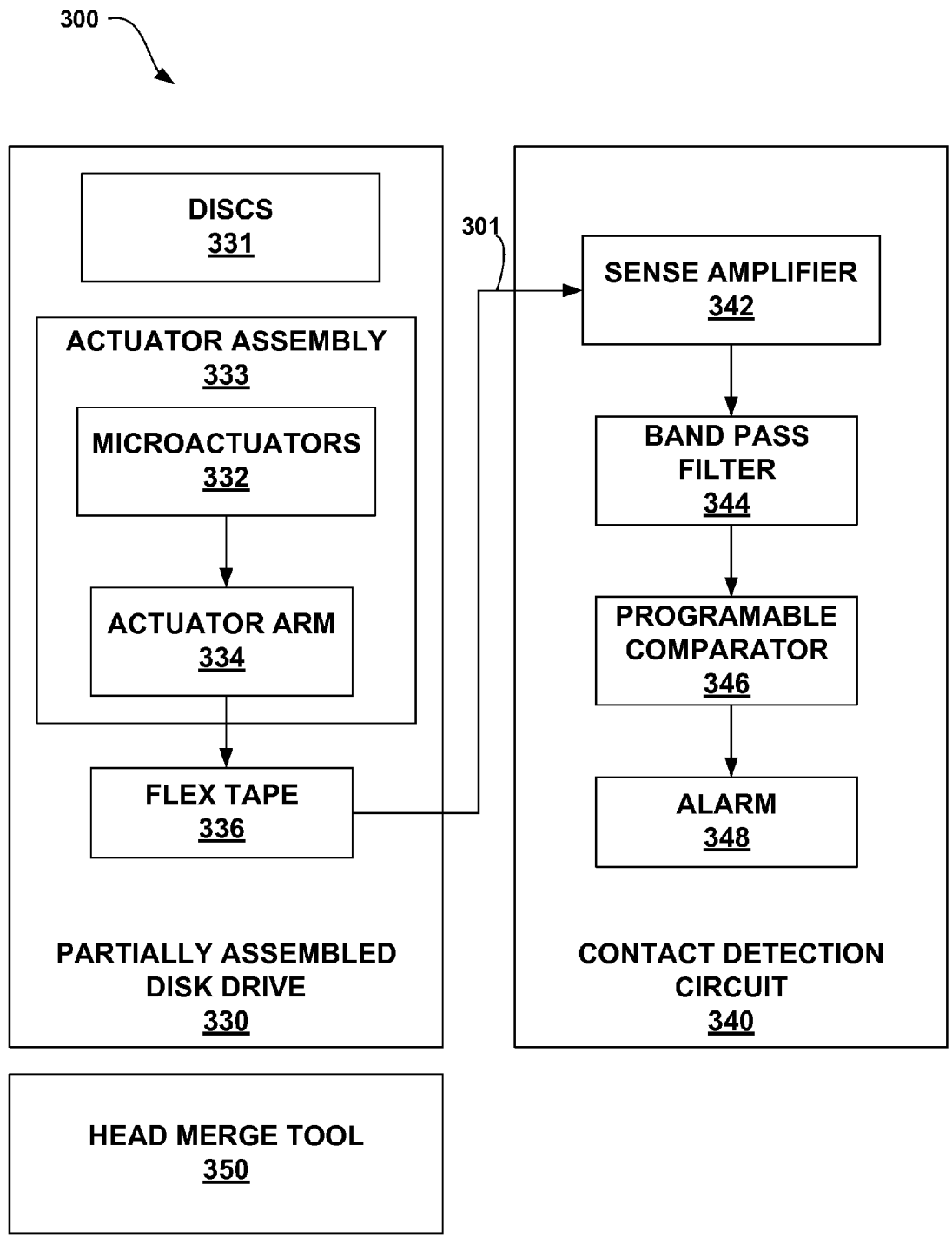
FIG. 3 is a conceptual block diagram illustrating a signal path for an exemplary head-disc contact detection circuit at a head merge station.

FIG. 3 is a conceptual block diagram illustrating signal path 301 for an exemplary head-disc contact detection circuit at head merge station 300. Signal path 301 includes partially-assembled disc drive 330 and contact detection circuit 340. Head merge station 300 also includes head merge tool 350. For example, head merge tool 350 may be a dynamic head merge tool, a static head merge tool or other head merge tool.

Signal path 301 begins with head positioning microactuators 332, which are in electrical communication with flex tape 336 via actuator arm 334. Flex tape 336 may also be referred to as a flex circuit. Microactuators 332 move in response to an electrical signal and, conversely, generate an electrical signal in response to deflection. For example, microactuators 332 may comprise one or more piezoelectric crystals, and/or other microactuation mechanisms that generate electrical signals in response to deflection. Contact detection circuit 340 is in electrical communication with head positioning microactuators 332 via flex tape 336 and actuator arm 334 of partially-assembled disc drive 330.

Partially-assembled disc drive 330 includes one or more discs 331. Each of discs 331 include one or more data storage surfaces, e.g., magnetically recordable data storage surfaces. Partially-assembled disc drive 330 also includes actuator assembly 333 and flex tape 336. Actuator assembly 333 includes actuator arm 334 and one or more read/write heads for each of the data storage surfaces of discs 331, the read/write heads each including one or more head positioning microactuators 332.

Contact detection circuit 340 optionally includes sense amplifier 342, which amplifies signals received from head positioning microactuators 332. Contact detection circuit 340 also optionally includes band pass filter 344, which may isolate portions of output signals from head positioning microactuators 332 that indicate head-disc contact. For example, band pass filter 344 may isolate a first sway mode of head positioning microactuators 332. In one example, a first sway mode of head positioning microactuators 332 may be between 10 kilohertz and 30 kilohertz, e.g., a first sway mode of head positioning microactuators 332 may be approximately 19 kilohertz.

Contact detection circuit 340 includes programmable comparator 346 that evaluates the output signal from head positioning microactuators 332 received from signal path 301 to determine if head-disc contact occurs in partially-assembled disc drive 330 during the head merge operation. Contact detection circuit 340 also includes alarm 348 which indicates the occurrence of head-disc contact occurs in partially-assembled disc drive 330. For example, alarm 348 may be a visible or audible alarm. As another example, alarm 348 may be a stop switch that prevents operation head merge tool 350 until an operator resets alarm 348, e.g., after performing a maintenance operation on head merge tool 350 to prevent additional head-disc contact. As another example, alarm 348 may comprise a computing device that sends notice of the head disc contact to a remote computing device via a network, such as a local area network or the Internet. Other embodiments of alarm 348 are also possible.

In some embodiments, contact detection circuit 340 may include a plurality of channels corresponding to each of microactuators 332. For example, if head-disc contact event occurs, contact detection circuit 340 may be able to determine at which of microactuators 332 head-disc contact occurred.

Alternate embodiments of contact detection circuit 340 include but are not limited to digital signal processing techniques such as Discrete Fourier Transform (DFT) analysis of output frequencies and magnitudes or matched filter processing.

Figure 4:
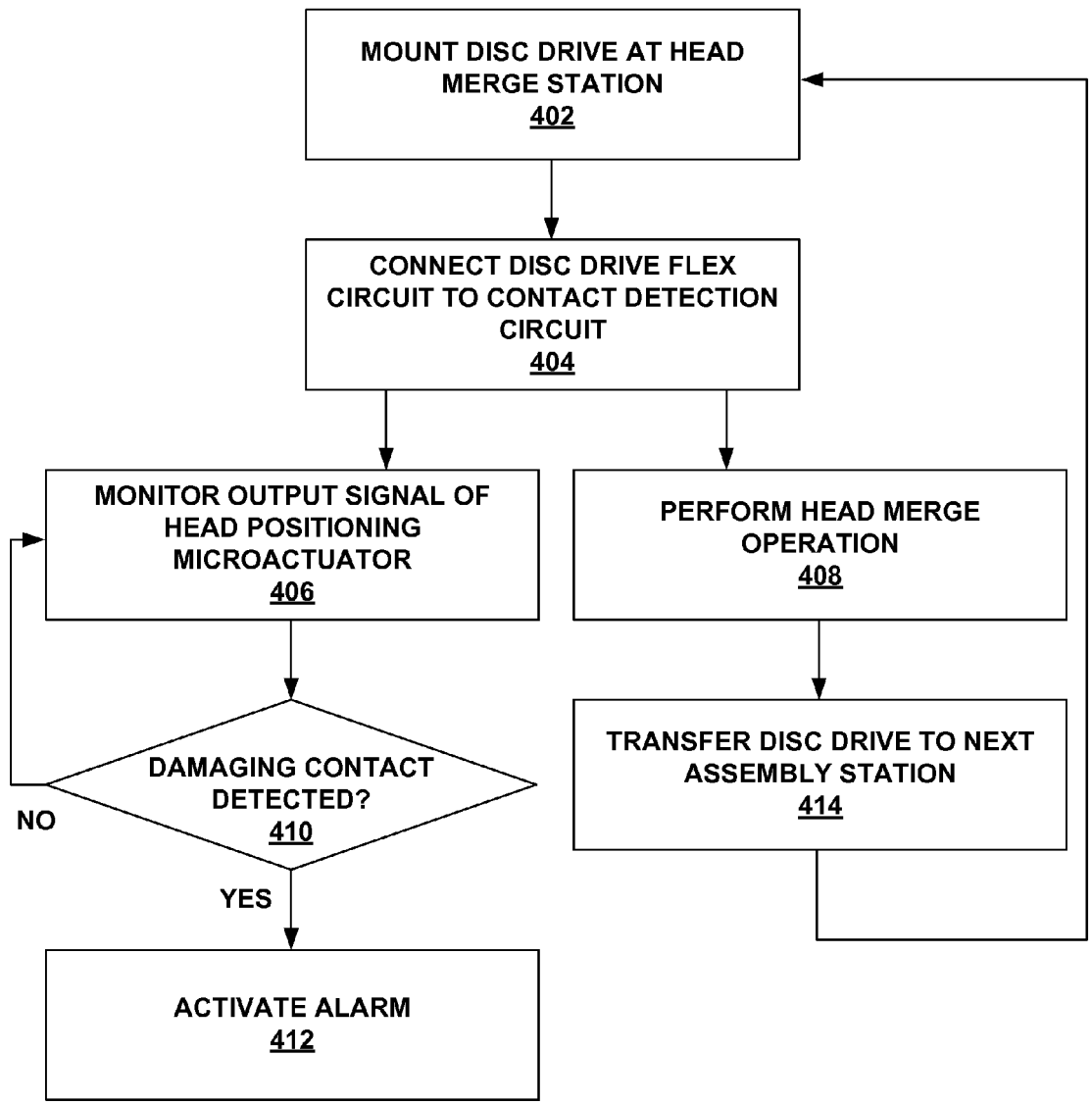
FIG. 4 is a flowchart illustrating exemplary techniques for detecting head-disc contact using a head positioning microactuator.

FIG. 4 is a flowchart illustrating exemplary techniques for detecting head-disc contact using a head positioning microactuator during manufacturing a plurality of disc drives. For clarity, the techniques illustrated in FIG. 4 are described with respect to head merge station 300 of FIG. 3.

First, disc drive 330 is mounted at head merge station 300, which includes contact detection circuit 340, e.g., by an operator or an automated system (402). The process of mounting disc drive 330 at head merge station 300 may include, e.g., a process of precisely positioning and aligning disc drive 330 relative to head merge tool 350 and fixedly securing disc drive 330 to maintain its position and alignment during a subsequent head merge operation using head merge tool 350.

Next, contact detection circuit 340 is electrically connected to flex tape 336 to form an electrical connection between contact detection circuit 340 and head positioning microactuators 332 (404). Contact detection circuit 340 monitors an output signal of the head positioning microactuators 332 (406). Head merge tool 350 performs a head merge operation to position the read/write heads on discs 331 while monitoring the output signal with contact detection circuit 340 (408). Contact detection circuit 340 evaluates the output signal of head positioning microactuators 332 while head merge tool 350 performs the head merge operation to determine whether a read/write head contacts one of discs 331 a contact magnitude sufficient to result in physical damage to at least one of the read/write head and the disc (410). In the event that one of the read/write heads contacts one of the discs 331 with sufficient force to exceed the programmed alarm threshold, contact detection circuit 340 activates alarm 348 (412). Following activation of alarm 348, an operator may perform maintenance on head merge station 300 before prior to head merge tool 350 performing the head merge operation on any additional disc drives.

Following the head merge operation, disc drive 330 is released from head merge station 300 and transferred to the next assembly station in the disc drive manufacture assembly line (414). Another disc drive in the plurality of disc drives is then mounted at head merge station 300 (402). The techniques described with respect to FIG. 4 are then repeated for each of the plurality of disc drives.

Various embodiments of the invention have been described. However, various modifications to the described embodiments may be made within the scope of the invention. For example, this document has described in detail the application of the invention to a head merge station in a drive manufacturing process. The invention may also be practiced in other processes where a head with a microactuator is loaded onto a disc. For example, other processes related to the manufacture of a disc drive load heads on to discs. As one example, the invention may be practiced at a media certification machine, where read/write heads are utilized to write and read on a disc to certify the number of defects on a disk. As another example, the invention may be practiced at bulk writing machine, which is used to write servo patterns on multiple discs prior to assembling the discs into disc drives. As yet another example, the invention may be used during dynamic testing and certification of heads. Other applications are also possible. Furthermore, the described embodiments are not limited to piezoelectric microactuators, but may be used with any microactuator that generates electrical signals in response to deflection. These and other embodiments are within the scope of the following claims.

The invention claimed is:

1. A method for detecting head-disc contact comprising:
    locating a head including a head positioning microactuator and at least one of a read transducer and a write transducer adjacent to a disc such that the head is in communication with the disc;
    monitoring an output signal from the head positioning microactuator of the head;
    evaluating the output signal by isolating a first sway mode of the microactuator to determine if the head contacts the disc; and
    initiating an alarm in response to the head contacting the disc with a contact magnitude sufficient to result in physical damage to at least one of the head and the disc.

2. The method of claim 1, further comprising performing a head merge operation to position the head on the disc while monitoring the output signal.

3. The method of claim 2, wherein performing a head merge operation comprises using a static head merge tool to position the head on the disc.

4. The method of claim 1, wherein evaluating the output signal comprises filtering the output signal with a band-pass filter.

5. The method of claim 1, further comprising:
    storing a record of the output signal if the head contacts the disc; and
    inputting the record into a statistical process control system used to evaluate the output signal.

6. The method of claim 1, wherein the head positioning microactuator is a piezoelectric microactuator.

7. The method of claim 1, wherein a contact detection circuit monitors the output signal from the head positioning microactuator of the head, evaluates the output signal to determine if the head contacts the disc, and initiates the alarm in response to the head contacting the disc with the contact magnitude sufficient to result in physical damage to at least one of the head and the disc, wherein the contact detection circuit includes a comparator that evaluates the output signal to determine if the head contacts the disc.

8. A method for detecting head-disc contact comprising:
    locating a head including a head positioning microactuator and at least one of a read transducer and a write transducer adjacent to a disc such that the head is in communication with the disc, wherein the head is a component of a bulk writing machine;
    monitoring an output signal from the head positioning microactuator of the head;
    evaluating the output signal by isolating a first sway mode of the microactuator to determine if the head contacts the disc; and
    writing a servo pattern to the disc with the head.

9. The method of claim 8, further comprising initiating an alarm in response to the head contacting the disc with a contact magnitude sufficient to result in physical damage to at least one of the head and the disc.

10. The method of claim 9, wherein a contact detection circuit monitors the output signal from the head positioning microactuator of the head, evaluates the output signal to determine if the head contacts the disc, and initiates the alarm in response to the head contacting the disc with the contact magnitude sufficient to result in physical damage to at least one of the head and the disc, wherein the contact detection circuit includes a comparator that evaluates the output signal to determine if the head contacts the disc.

11. The method of claim 8, further comprising installing the disc in a disc drive.

12. The method of claim 8, wherein the head positioning microactuator is a piezoelectric microactuator.

13. A method for detecting head-disc contact comprising:
    locating a head including a head positioning microactuator and at least one of a read transducer and a write transducer adjacent to a disc such that the head is in communication with the disc, wherein the head is a component of a media certification machine;
    monitoring an output signal from the head positioning microactuator of the head;
    evaluating the output signal by isolating a first sway mode of the microactuator to determine if the head contacts the disc;
    performing reading and writing operations to the disc with the head; and
    certifying a number of defects on the disc based on the reading and writing operations.

14. The method of claim 13, further comprising initiating an alarm in response to the head contacting the disc with a contact magnitude sufficient to result in physical damage to at least one of the head and the disc.

15. The method of claim 14, wherein a contact detection circuit monitors the output signal from the head positioning microactuator of the head, evaluates the output signal to determine if the head contacts the disc, and initiates the alarm in response to the head contacting the disc with the contact magnitude sufficient to result in physical damage to at least one of the head and the disc, wherein the contact detection circuit includes a comparator that evaluates the output signal to determine if the head contacts the disc.

16. The method of claim 13, further comprising installing the disc in a disc drive.

17. A method for detecting head-disc contact comprising:
    locating a head including a head positioning microactuator and at least one of a read transducer and a write transducer adjacent to a disc such that the head is in communication with the disc;
    monitoring an output signal from the head positioning microactuator of the head;
    evaluating the output signal by isolating a first sway mode of the microactuator to determine if the head contacts the disc; and
    performing dynamic testing and certification of the head by reading and writing to the disc with the head.

18. The method of claim 17, further comprising initiating an alarm in response to the head contacting the disc with a contact magnitude sufficient to result in physical damage to at least one of the head and the disc.

19. The method of claim 18, wherein a contact detection circuit monitors the output signal from the head positioning microactuator of the head, evaluates the output signal to determine if the head contacts the disc, and initiates the alarm in response to the head contacting the disc with the contact magnitude sufficient to result in physical damage to at least one of the head and the disc, wherein the contact detection circuit includes a comparator that evaluates the output signal to determine if the head contacts the disc.

20. The method of claim 17, further comprising installing the head in a disc drive.

21. The method of claim 17, wherein the head positioning microactuator is a piezoelectric microactuator.

* * * * *